United States Patent [19]

Reed

[11] 4,383,312
[45] May 10, 1983

[54] MULTIPLEX SYSTEM TESTER

[75] Inventor: Robert C. Reed, San Diego, Calif.

[73] Assignee: The United States of America as represented by the Secretary of the Navy, Washington, D.C.

[21] Appl. No.: 211,011

[22] Filed: Nov. 28, 1980

[51] Int. Cl.³ .................... G06F 11/00; G01R 31/28; H04B 3/46; H04J 3/14

[52] U.S. Cl. ........................................ 370/13; 371/27

[58] Field of Search ...................... 370/15, 13, 17, 29, 370/48, 100; 371/27, 20, 25, 28, 15; 324/73 R; 178/69 A, 69 G

[56] References Cited

U.S. PATENT DOCUMENTS

| | | | |
|---|---|---|---|
| 3,706,854 | 12/1972 | Dickson et al. | 370/17 |
| 3,769,454 | 10/1973 | Liberman et al. | 370/29 |
| 3,786,187 | 1/1974 | DeVita et al. | 178/69 A |
| 3,920,919 | 11/1975 | Aillet | 370/13 |
| 3,938,144 | 2/1976 | Pederson et al. | 370/48 |
| 4,028,536 | 6/1977 | Woodward | 371/15 |
| 4,037,050 | 7/1977 | Lefkowitz et al. | 178/69 G |
| 4,222,514 | 9/1980 | Bass | 371/27 |

Primary Examiner—Thomas A. Robinson

Attorney, Agent, or Firm—Robert F. Beers; Ervin F. Johnston; Harvey Fendelman

[57] ABSTRACT

An apparatus for testing a data multiplex transmission system by providing a simulated source and sink of data for the multiplex transmission system that is compatible with the multiplex system and complies with the protocol of the Input/Output modules of the multiplex system. A programmable read only memory is programmable by means of toggle and thumbwheel switches to selectively and variably control the protocol, the length, the rate, the destination and the content of the data message. A status display is connected to the programmable read only memory to indicate the current point of progression of its programmable sequence. An error detector is connected to the programmable read only memory for determining whether the memory has stalled at a point of progression and an error display is also connected to the programmable read only memory to indicate and identify the error when this stall condition has occurred. A random access memory is included in the apparatus for storing the data received by it and a display is provided for displaying the contents of the random access memory.

10 Claims, 1 Drawing Figure

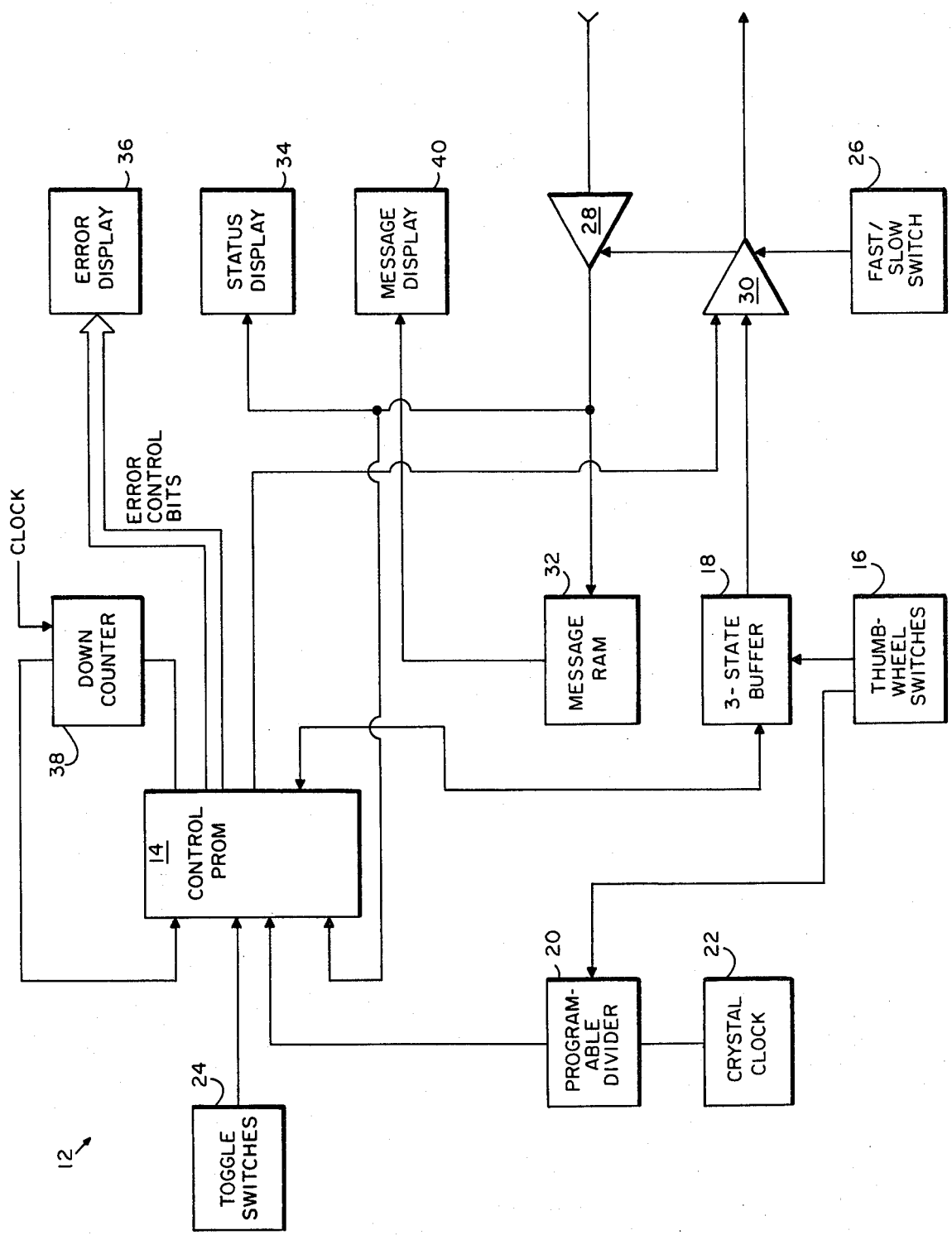

MULTIPLEX SYSTEM TESTER

BACKGROUND OF THE INVENTION

The present invention relates generally to an apparatus for testing a data multiplex transmission system by simulation of the terminal devices of the multiplex system. More particularly, the present invention relates to an apparatus for testing data multiplex transmission networks and systems that is capable of simulating the actual use conditions of communications between the computers and other terminals connected to the data multiplex system.

Before the present invention was developed, it was necessary to test the data multiplex system Input/Output modules and the associated functions of the multiplex system by using one of the computers of the system to provide data to the transmission bus of the system and a second computer of the system to receive it. The problems encountered in testing the multiplex system in this manner were inadequate for the following reasons. First, a different software package was required for each type of computer involved with the multiplex system. Developing this software was a time consuming and expensive procedure. The only practical method of testing the software was to use the multiplex system under test which led to extreme difficulty in sorting out the problems encountered. Since the computers operating through the multiplex system themselves were used to provide these test functions, high cost computer time was lost. Further, since one of the multiplex system computers was controlling the test operation, when an error occurred it was difficult to determine where the error occurred since such error might have been produced by misoperation of the computer itself.

SUMMARY OF THE INVENTION

The present invention solves the foregoing problems by providing a mechanism for testing the performance of a data multiplex system without the use of computers or a computer programmer. The testing of the Input/Output modules and the related signal paths associated with the data multiplex system under test is accomplished by the tester of the present invention which simulates a computer of the data multiplex system. More specifically, a control programmable read only memory (PROM) is programmed by toggle and thumbwheel switches to determine the sequence of hardware control signals to be generated. The flow of data control information to and from the data multiplex transmission system bus is regulated by the control PROM. The toggle and thumbwheel switches determine the message control parameters including, for instance, the length of the message, the rate of the message, the transmission protocol, the destination of the message and the content of the data message as selected by the operator. The current status of the tester of the present invention is indicated by three sets of light emitting diode (LED) displays. One display indicates the state of the multiplex transmission system "handshake", i.e. the transmitter-receiver synchronization. A second display indicates when an error has occurred and its identity by sensing that the control PROM has dwelled upon a protocol event for more than a predetermined period of time. The final display indicates the data stored in memory that has just been received by the tester of the present invention.

By utilization of the tester of the present invention it is possible to isolate data multiplex system problems without the use of expensive and complex computers. Software design for the test functions is completely eliminated and the present invention enables the testing of the data multiplex system and its Input/Output modules and all of its operating modes. In addition, the isolation of system faults is greatly facilitated by use of the present invention. Also, an automatic reset feature may be provided in the present invention to enable a fault condition to be repeated periodically at a predetermined rate to enable the localization of the data multiplex system problems.

Whereas other apparatus have been disclosed for use in testing data networks where the link of the source to the sink has been established in advance by the multiplex network itself, the present invention has the capability of testing the data multiplex system by itself establishing and changing the link from the data source to the data sink in the multiplex system. This capability greatly enhances the test function and aids in the isolation of system faults.

OBJECTS OF THE INVENTION

Accordingly, it is a primary object of the present invention to provide an apparatus for testing data multiplex systems without the use of computers and without the need for software design for the test function.

It is a further object of the present invention to disclose a test apparatus for a data multiplex system that has the capability of testing a data multiplex system that includes a very large number of data sources and data sinks.

These and other objects of the invention will become more readily apparent from the ensuing description when taken with the appended claims and drawings.

BRIEF DESCRIPTION OF THE DRAWINGS

The sole FIGURE is a schematic block diagram of the data multiplex system tester of the present invention.

DESCRIPTION OF THE PREFERRED EMBODIMENT

With reference to the drawing of the present invention will now be described. A data multiplex system is comprised of a multiplex data bus that is used to transfer data from one location to another location. For example, the Shipboard Data Multiplex System (SDMS) is a Navy multiplex data bus that is used to transfer data from one location on a ship to another location. One type of SDMS users are Navy Tactical Data System (NTDS) computers. The SDMS is used as the medium to transfer NTDS data between these computers. The tester of the present invention may be used to simulate the NTDS computer type of SDMS user for the purpose of testing the SDMS/COMPUTER INTERFACE. It also facilitates the establishment of data paths by way of the SDMS. It is to be understood that although reference in the present specification is made to the SDMS and the NTDS systems the present invention is suitable for use with any data multiplex system.

The heart of the present invention 12 is the control PROM 14 which determines the sequence of hardware control signals to be generated. The control PROM is a sequencer which generates a sequence of data transmissions that are consistent with the protocol of the multiplex system under test. As an example of how the programmable sequence of the control PROM 14 might progress, the tester 12 might be utilized in a source initiated message mode. In that mode the first event may be a data request message initiated by control PROM 14. This data request message could include a data sink address followed by a binary word that would be understood by the data sink as an interrogation as to whether the data sink is ready to receive information. The next point of progression of the programmable sequence could then be a waiting period wherein the control PROM 14 awaits a response from the data sink as to whether the data sink is prepared to receive the data transmission. If this acknowledgement is received by the control PROM 14, the control PROM 14 will progress to the next point of its sequence wherein it actually sends the data. As another example of a protocol sequence which might be performed by the control PROM 14, the control PROM 14 may operate in a sink initiated mode. In this example a data request message would be received by the control PROM 14, in essence asking it whether it will send data to the requesting terminal. The next point of progression of this programmable sequence could then be the actual transmission of the data from the control PROM 14 to the requesting sink of the data.

The type of message, control parameters, direction of data flow, etc. are selected by the operator via the decimal thumbwheel switches 16. More specifically, the thumbwheel switches are utilized to program in the data message length, the data message destination, the data message rate, the data message content and the update rate, i.e. how many times per second the data message is sent. As illustrated in the drawing there are two outputs from the thumbwheel switches 16. The first output is to the three-state buffer 18 and the second output is to the programmable divider 20. Three state buffer 18 has three logic states, namely, high, low and off. The tester 12 of the present invention, in its preferred embodiment, is implemented using a bus architecture. In other words, communication between the components of the tester 12 itself is done via an internal bus network. The three state buffer 18 allows access to the internal bus of the tester 12 to one of the components of the tester 12 without interfering with the other components thereof. The information programmed on thumbwheel switches 16 therefore is transferred to the control PROM via the three state buffer 18 and the internal bus network of the tester 12 with the following exception. The thumbwheel switch of the group of thumbwheel switches 16 that is dedicated to programming the update rate is connected to the control PROM 14 via the programmable divider 20. The tester timing is generated from crystal clock 22. From the clock 22 the message update timing is derived after frequency division by the programmable divider 20. The division factor is selected by the operator from the thumbwheel switch of the group of thumbwheel switches 16 that is connected to divider 20. Operation of that particular thumbwheel switch therefore controls the factor by which the programmable divider 20 divides the output signal of the crystal clock 22. Thereby, the update rate is dictated to the control PROM 14.

Toggle switches 24 are directly connected to the control PROM 14 and are binary decision devices which may be used to program into the tester 12 parameters such as whether the multiplex fast or slow interface 26 is to be utilized, whether a 16 bit or 32 bit data message length is to be used or whether a manual or automatic data message transfer is to be used.

The flow of data and control information to and from the data multiplex bus is regulated by the control PROM 14. This information is buffered by the buffer networks 28 and 30, designed in the preferred embodiment in MIL-STD-1397, Type A or Type B compatible levels. As stated above it is possible to select Type A or Type B protocol using the front panel toggle switch 24.

Message RAM 32 receives transmissions of data from the multiplex system under test via the buffer network 28 and stores the received message. In the preferred embodiment, it communicates with its associated display, described below, via a three state buffer (not shown) identical to buffer 18.

The current status of the tester 12 is displayed using three display devices which are preferably light emitting diode (LED) displays. The first display 34 is a status display consisting of seven LED lamps which indicates the state of the "handshake" between the tester 12 and the multiplex system under test. The status display 34 thus indicates the point of progression in the system protocol of the control PROM 14. For instance, the status display would indicate whether the control PROM 14 is transferring data, waiting for a message update, waiting for header information or for the end of a message signal. The status display 34 in the preferred embodiment is activated by a three bit code from the control PROM 14. This three bit code changes as the control PROM 14 sequences from one function to the next. Error display 36 indicates when an error has occurred and the nature of the error. As the control PROM 14 progresses from one function in the protocol to the next function, it resets down counter 38. Preferably, the down counter 38 sequences from a maximum count to 0 at a rate determined by the clock input. When it is reset it begins sequencing again from the maximum count. As long as the control PROM 14 is properly advancing from function to function in the protocol, the counter 38 will be reset before it reaches a count of 0. If, however, a problem occurs such as the failure of the data multiplex system to send an acknowledge message to the control PROM 14, the counter 38 will not be reset and will reach a count of 0. When this happens the control PROM 14 is informed by an output from the down counter 38 and generates an error code signal which is provided to the error display device 36. The error display device 36 thus displays the proper error code. Examples of errors that may occur in this system are as follows: The header word has not been accepted by the data multiplex system; the complete data message has not been received by the data multiplex system; an end of message interrupt signal has not been provided by the data multiplex system; the data multiplex system is requesting more data than specified; the data multiplex system has not provided the header word; the data multiplex system will not accept the entire data message; the data multiplex system will not accept the end of message interrupt signal; the data multiplex system is not updating the message. These and other error codes depending upon the particular data multiplex system under test and the particular requirements of the operator and the use of the system may therefore be displayed on error display 36.

The final component of the tester 12 to be described is the message display device 40. The message display device 40 receives its input from the message RAM 32 and indicates the data that has been stored in that memory 32. The message display 40 thereby provides a display of what message has been received by the tester 12 from the data multiplex system under test.

The tester 12 has three autonomous modes of operation. When operating in the source mode, data is provided to the data multiplex system under test via the input module of that data multiplex system using an appropriate electrical interface. For the SDMS, for instance, one of the interface requirements is specified in MIL-STD-1397. The protocol used in the transfer of data to or from the tester 12 conforms to the unique requirements of the data multiplex system under test. The following are examples of user selectable options which may be programmed into the tester 12 via the toggle switches 24 and the thumbwheel switches 16: the data message length; the data message destination; the interface type (for instance, MIL-STD-1397, Type A or Type B); the data message rate; the data message content; the manual or automatic data message transfer; a 16 or 32 bit data message length; the update rate.

If desired a pulse counter (not shown) may be attached to the tester 12 to monitor the number of messages that have been transferred.

The second mode of operation of the tester 12 is the data sink mode and is complementary to the first mode. In the data sink mode, the tester 12 receives the data transmitted from a remote data source which may be, for instance, a second tester 12 or a computer user of the data multiplex system under test. The information received by the tester 12 is displayed on the message display device 40 and may, for instance, include the following types of information; the address and memory where the data word being received is stored; the content of the data word being received.

The third operating mode is used to isolate problems in the system or its associated Input/Output module. This mode operates concurrently with one of the other two modes. As examples of this third operating mode, the operator may select via the toggle switches 24 and/or the thumb wheel switches 16 an automatic or manual mode of resetting the data transfer when a failure occurs or an automatic or step mode of tester software instruction execution.

In order to utilize the tester 12, the operator would connect it to the data multiplex system under test and would use the tester in either a source initiated or sink initiated mode. In order to determine, for instance, whether the data multiplex system under test is functioning properly, in the case where the tester 12 is used as the data source, the operator would send a data transmission from the tester 12 noting what data he has transmitted by the position of the toggle switches 24 and thumbwheel switches 16. He would then call another person positioned at the intended sink of the data transmission and inquire of him whether the data was received and, if so exactly what data was received. If the person at the sink responds that he has received a data transmission and informs the operator of the contents of that data transmission, the operator may then compare this information with the setting of the thumbwheel switches 16 and toggle switches 24. He will then know instantly whether an error has occurred. Likewise, where the tester 12 is used as the sink of data, the operator would compare the information actually received by the tester 12 with the information sent by a source on the data multiplex system bus. Knowledge of what was sent would be obtained by the operator, for instance, by calling another person at the source location of the data transmission. He would then compare this with the information displayed on message display device 40.

The present invention thus has the capability of generating and sending a "request to send data message" and then sending a data message. It has the further capability of receiving a "request to send data message" and then transmitting a data message and of receiving a "request to send data message" and then receiving a data message. The present invention is capable of sending messages to or from multiple data sources and sinks. Additionally, the present invention may be used with data buses where the link from the sink to the source is established and changed by the tester 12 itself.

Obviously, many modifications and variations of the present invention are possible in the light of the above teachings. It is therefore to be understood that within the scope of the appended claims the invention may be practiced otherwise than as specifically described.

What is claimed is:

1. An apparatus for testing a data transmission system including a set of data sources and a set of data sinks connected to a transmission bus comprising:
   programmable means for providing a digital data message output in a programmable sequence;
   first means connected to said programmable means for selectively and variably controlling the length of said data message, the rate of said data message, the destination of said data message, and the content of said data message;
   status display means connected to said programmable means for indicating the current point of progression of said programmable sequence;
   error detecting means connected to said programmable means for determining whether said programmable means has stalled at a point of progression for more than a predetermined period of time;
   error display means connected to said programmable means for indicating that said predetermined period of time has elapsed;
   memory means for connection to said data transmission system for storing data transmitted to said apparatus via said transmission bus; and
   message display means for displaying the contents of said memory means.

2. The apparatus of claim 1 further comprising:
   buffer means for connecting said apparatus to said data transmission system.

3. The apparatus of claim 1 wherein said programmable means comprises a programmable read only memory.

4. The apparatus of claims 1 or 3 wherein said first means comprises:
   a set of toggle switches connected to said programmable means; and
   a set of thumbwheel switches connected to said programmable means.

5. The apparatus of claim 4 wherein said first means further comprises:
   a clock signal generator; and
   a programmable frequency divider connected to said clock signal generator and to said programmable means.

6. The apparatus of claim 1 wherein said status display means, said error display means and said message display means each comprise an LED display.

7. The apparatus of claims 1 or 3 wherein said memory means comprises a random access memory.

8. The apparatus of claims 1, 2 or 3 wherein said error detecting means comprises:

a counter connected to said programmable means.

9. The apparatus of claim 8 wherein said counter is a down counter.

10. The apparatus of claim 1 wherein said first means variably and selectively controls the transmission protocol type.

* * * * *